Figure 1:
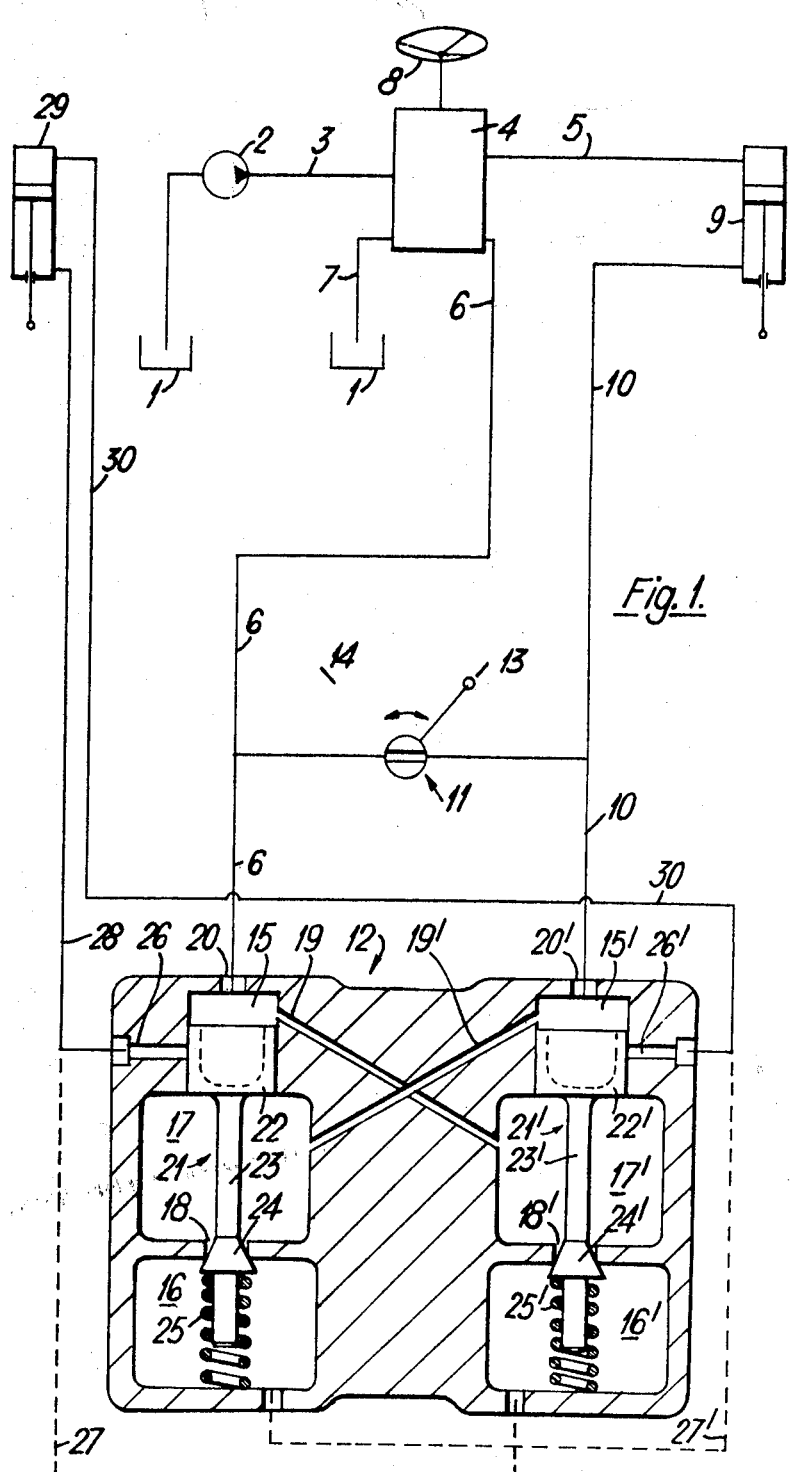

United States Patent

[11] 3,583,517

[72] Inventor Pietro Pensa
 Milan, Italy
[21] Appl. No. 855,893
[22] Filed Sept. 8, 1969
[45] Patented June 8, 1971
[73] Assignee Massey-Ferguson Services N.V.
 Curacao, Antilles, Netherlands
[32] Priority Sept. 11, 1968
[33] Italy
[31] 21103 A/68

[54] HYDRAULIC STEERING SYSTEMS
 7 Claims, 2 Drawing Figs.
[52] U.S. Cl.................................................... 180/79.2,
 60/52
[51] Int. Cl...................................................... B62d 5/08
[50] Field of Search............................................ 180/79.2,
 79.2 B, 79.2 C; 60/52 S, 53

[56] References Cited
 UNITED STATES PATENTS
3,202,238  8/1965  Strader........................ 180/79.2(C)
3,390,735  7/1968  Medley et al................. 180/79.2(B)
3,495,674  2/1970  Askins et al.................. 180/79.2(C)

Primary Examiner—Benjamin Hersh
Assistant Examiner—Leslie J. Paperner
Attorney—Gerhardt, Greenlee & Farris ABSTRACT: A hydraulic steering system is provided for selective two-wheeled or four-wheeled steering of a vehicle having at least four dirigible wheels. The system includes a pump, a steering valve for directing the flow from the pump in a manner appropriate to the desired steering direction, and steering motors for steering associated pairs of wheels. A manually operable openable or closable valve is connected with the steering valve and one steering motor for steering an associated pair of wheels. A pressure-responsive valve arrangement is connected in parallel with the manually openable valve and is connected with another steering motor for steering another associated pair of wheels. The pressure-responsive valve arrangement is operative to direct flow to and from the other steering motor only when pressure is applied at one or the other side of the manually operable valve in a direction dependent on which side of the manually operable valve is under pressure.

Fig. 1.

Inventor
PIETRO PENSA

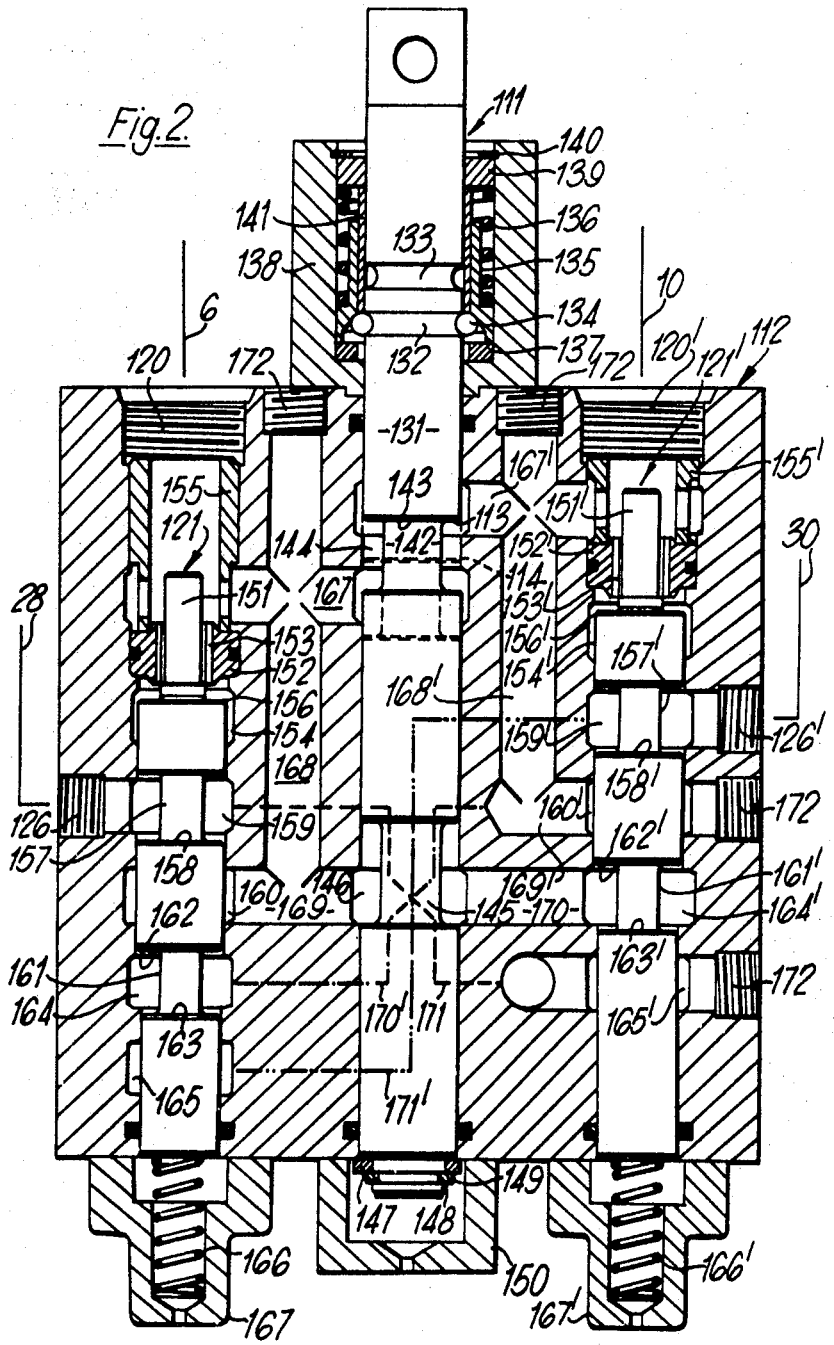

HYDRAULIC STEERING SYSTEMS

The present invention relates to a hydraulic steering system for selective two-wheeled or four-wheeled steering of a vehicle having at least four dirigible wheels.

According to the invention a system with this selective facility comprises a pump, a steering valve for directing the flow from the pump in a manner appropriate to the desired steering direction, steering motors for steering associated pairs of wheels and valve means for selecting steering either of two wheels or of four wheels, the valve means including a manually operable openable or closable valve connected with the steering valve and one steering motor for steering an associated pair of wheels, and a pressure-responsive valve arrangement connected in parallel with the manually openable valve and connected with another steering motor for steering another associated pair of wheels, the pressure-responsive valve arrangement being operative to direct flow to and from the other steering motor only when pressure is applied at one or the other side of the manually operable valve in a direction dependent on which side of the manually operable valve is under pressure.

Preferably, the pressure-responsive valve arrangement comprises a pair of valves each including a valve member responsive to pressure applied in first and second chambers, the first chamber of each valve and the second chamber of the other valve being in common constant communication with a respective side of the manually openable valve and each side of the other steering motor being communicable with the first chamber of one valve on opening of that one valve and communicable with the second chamber of the other valve on opening of that other valve and each valve being such it will open only when pressure is applied to its first chamber to the exclusion of its second chamber.

Conveniently, the valve member of each valve is spring urged towards a closing position, includes a first closure portion for opening into, and closing from, communication with the first chamber of that valve a port connected to one end of the other steering motor, and includes a closure portion for opening into, and closing from, communication with the second chamber a third chamber in constant communication with the other end of the other steering motor.

The invention will now be described, by way of example, with reference to the accompanying drawings, in which:

FIG. 1 is a diagrammatic representation of a system according to the invention including one form of pressure-responsive valve arrangement in section and a separate valve for conversion between two and four wheel steering; and FIG. 2 is a sectional view of a modified composite valve arrangement to replace the pressure-responsive valve arrangement and separate conversion valve in FIG. 1.

In FIG. 1 of the drawing an oil reservoir 1 is connected to a pump 2 which is connected by a line 3 to a steering valve 4. Two lines 5 and 6 are connected to the valve 4 and a line 7 is provided to return oil from the valve to the reservoir 1. The steering valve 4 is operated by a steering wheel 8 which, depending on the direction in which it is turned from the straight-ahead position connects lines 3 and 5 alternatively with lines 5 and 6. The line 5 is connected to one end of a steering motor here shown for simplicity as a hydraulic ram 9 for one pair of wheels. The other end of the ram 9 is connected to a line 10 and between lines 6 and 10 a manually operable openable or closable valve 11 is connected, which valve when in position 13 permits flow directly between the lines 6 and 10 and when in position 14 prevents it. This comprises a first circuit for steering the one pair of wheels.

The lines 6 and 10 continue to a pressure-responsive valve arrangement 12 comprising two identical valves. The line 6 is connected to a port 20 in one valve the port constantly communicating with a first chamber 15 in which a pressure-responsive element in a piston portion 22 of valve member 21 is slidable in a fluidtight manner to open and close a port 26. Below the chamber 15 is a second chamber 17 having a port 18 closable by a closure portion 24 of smaller cross-sectional area than the piston portion 22, on a spindle 23 of the valve member 21. The port 18 when open establishes communication between the chamber 17 and a third chamber 16 in which is housed a compression spring 25 located between the closure 24 and the floor of the chamber 16. The spring 25 urges the closure portion 24 and the piston portion 22 in a direction respectively to close the ports 18 and 26. Likewise, the line 10 is connected to a port 20' in the other valve which valve is identical with that already described and the features of which are identified by the same reference numerals with a prime added. Chambers 15 and 17' are constantly interconnected by a line 19 and chambers 15' and 17 are constantly interconnected by a line 19'. Furthermore, the port 26 and the chamber 16' are constantly interconnected by a line 27 and the port 26' and the chamber 16 are constantly interconnected by a line 27'. The lines 27 and 27' are preferably internal but for sake of simplicity they are shown dotted. The port 26 is also connected by a line 28 to one end of a steering motor, here shown for simplicity as a hydraulic ram 29 for another pair of wheels and the other end of the steering motor is connected by a line 30 to the port 26'.

If only the ram 9 is desired to be actuated the valve 11 is placed in the position 13. Thus, on turning the steering wheel 8 in a direction to interconnect lines 3 and 5 and lines 6 and 7 the ram 9 is moved downwards and the oil displaced thereby is fed via the line 10, the open valve 11 and the lines 6 and 7 to the reservoir 1. Conversely, on turning the steering wheel 8 in the opposite direction to interconnect lines 3 and 6 and lines 5 and 7 the ram 9 is moved upwards by oil fed via the line 6, the open valve 11 and the line 10, the oil displaced by the ram being fed via the lines 5 and 7 to the reservoir 1. When the valve 11 is open whether the steering wheel 8 is turned in one direction or the other the valve arrangement 12 is inoperative since in one case the springs 25, 25' retain the ports 18, 18' closed and in the other case both chambers 17 and 17' are under pressure via lines 10 and 19' and lines 6 and 19 respectively and the greater cross-sectional areas of the pistons 22, 22' than of the closures 24, 24' produce forces augmenting those of the springs 25, 25' retaining closed the ports 18, 18', 26, 26' against the opening forces produced by the pressures in the chambers 15, 15'. Thus no effect is felt at the ram 29 and therefore only the wheels associated with the ram 9 are steered.

If however, both rams 9 and 29 are desired to be actuated the valve is closed in the position 14. Thus, on turning the steering wheel 8 in a direction to interconnect lines 3 and 5 and lines 6 and 7 the ram 9 is again moved downwards and the oil displaced thereby is fed via the line 10 to the port 20'. The effect of this is twofold: it pressurizes the chamber 17 via the line 19' so that the ports 18 and 26 remain closed and it also forces down the valve member 21' to open the ports 18' and 26'. In opening the port 26' oil is fed to the top of the ram 29 via the line 30 and the chamber 16 is pressurized via the line 27' further to augment the closing forces on the valve member 21. The ram 29 is moved downwards and the oil displaced thereby is fed to the chamber 16' via the lines 28 and 27, there being no feed through the port 26 since it is closed. From the chamber 16' the oil is fed back to the reservoir 1 via the open port 18', the chamber 17', the line 19, the chamber 15, the port 20 and the lines 6 and 7.

Conversely, on turning the steering wheel 8 in the opposite direction to interconnect lines 3 and 6 and lines 5 and 7 oil is fed to the chamber 15 via the line 6 and the port 20 to pressurize the chamber 17' via the line 19 so that the ports 18' and 26' remain closed and force down the valve member 21 so that the ports 18 and 26 are opened. In opening the port 26 oil is fed to the lower end of the ram 29 via the line 28 and the chamber 16' is pressurized via the line 27 further to augment the closing forces on the valve member 21'. The ram 29 is moved upwards and the oil displaced thereby is fed to the lower end of the ram 9 via the lines 30 and 27', the chamber 16, the open port 18, the chamber 17, the line 19', the chamber 15, the port 20' and the line 10. The ram 9 moves upwards and oil displaced thereby is fed back to the reservoir 1 via lines 5 and 7.

Referring now to FIG. 2 wherein similar parts to those in FIG. 1 are identified by the same reference numerals with 100 added, lines 6, 10, 28 and 30 are included to show how a composite valve arrangement 112 of FIG. 2 is connected into the system.

A central spool valve member 111 has at its upper end means for manual movement between upper and lower positions 113 and 114. In order that these positions of the member 111 may be felt by the operator an upper portion 131 is provided with two spaced-apart circumferential grooves 132 and 133 cooperable with balls 134 which are yieldingly urged inwardly towards the portion 131 by means of a cylindrical slide 135 having an internal tapering camming surface in contact with the balls. The slide 135 is urged downwardly by a compression spring 136 to a stop ring 137 in a cylindrical casing 138. The upper end of the spring 136 bears against another ring 139 held captive within the casing 138 by a circlip 140. Between the slide 135 and the portion 131 is a cylindrical sleeve 141.

Below the portion 131 the member 111 is inserted at 142 to provide a shoulder 143 which opens and closes a chamber 144. Below the waist 142 is provided another waist 145 which maintains open a chamber 146 in either position of the member 111. The lower end of the member 111 has a collar 147 retained on a neck 148 of the member by a circlip 149 to prevent inadvertent removal of the member 111. The parts 147, 148 and 149 are movable within a vented cover 150.

On each side of the member 111 is another spool valve member, one numbered 121 and the other 121'. Each of these has an upper neck 151, 151' slidable in a bush 152, 152' which is bored at 153, 153' to provide channels for oil leading from ports 120, 121' to chambers 154, 154'. The bush 152, 152' is seated in the arrangement 112 by an apertured tubular insert 155, 155'. Below the shoulder 156, 156' the member 121, 121' is waisted at 157, 157' and below the waist is another shoulder 158, 158' for opening and closing communication between chambers 159, 159' and 160, 160'. Chambers 159, 159' open into ports 126, 126'. Below the shoulder 158, 158' the member 121, 121' has a waist 161, 161' between an upper shoulder 162, 162' and a smaller lower shoulder 163, 163' for opening and closing communication between chambers 164, 164' and 165, 165'. The lower end of the member 121, 121' rests on a compression spring 166, 166' housed in a vented cover 167, 167' in which the lower end of the member 121, 121' is movable.

The ports 120 and 120' open into bores 167 and 167' which meet at the chamber 144. The bore 167, 167' also branches into another bore 168, 168'. The bore 168 then joins a bore 169 interconnecting chambers 146 and 160. A bore 170 also interconnects chambers 146 and 164'. The bore 168' joins a bore 169' leading to the chamber 160' and also, via borings diagrammatically indicated by dot-dash line 170', to the chamber 164. Chambers 159 and 165' are interconnected by borings diagrammatically indicated by dash-dash line 171 and chambers 159' and 165 are interconnected by borings diagrammatically indicated by dot-dot-dash line 171'. Portions of bores which are unused but are provided for ease of manufacture are blanked off as at 172.

The valve arrangement 112 is shown in the condition in FIG. 2 with the ports 120 and 120' in communication via bores 167 and 167' and the open chamber 144 so that the ram 29 will not be operated by the steering wheel. The arrangement is conditioned to bring the ram 29 into operation by moving the spool valve member 111 to its lower position with the balls 134 seated in the groove 133 and chamber 144 closed. Now referring to FIG. 1 as modified by FIG. 2, on turning the steering wheel 8 in a direction to interconnect the lines 3 and 5 and lines 6 and 7, the ram 9 is moved downwards and the oil displaced thereby is fed via line 10 to the port 120'. This causes oil to enter the chamber 164 via the bores 167', 168', 169' and 170', and since the shoulder 162 is larger than the shoulder 163 the oil pressure in the chamber 164 acts in a direction to augment the force of the spring 166 in retaining the spool valve member 121 in its upper position. It also causes oil to enter the chamber 154' so that the pool valve member 121' is moved to its lower position and place the chamber 160' in communication with the chamber 159' and the chamber 165' in communication with the chamber 164'. This causes oil to be fed from the bore 169' into the line 30 so that the ram 29 is also moved downwards. Oil displaced by the ram 29 is then fed to the reservoir 1 via line 28, port 126, chamber 159, bores 171, chambers 165' and 164', bores 170, 168 and 167, port 120 and lines 6 and 7.

Conversely, on turning the steering wheel 8 in the opposite direction to interconnect lines 3 and 6 and lines 5 and 7, oil is fed via the line 6 to the port 120. This causes oil to enter the chamber 164' via the bores 167, 168 and 169, chamber 146 and bore 170, and since the shoulder 162' is larger than the shoulder 163' oil pressure in the chamber 164' acts in a direction to augment the force of the spring 166' in retaining the spool valve 121 in its upper position. It also causes oil to enter the chamber 154 so that the spool valve member 121 is moved to its lower position and place the chamber 160 in communication with the chamber 159 and the chamber 165 in communication with the chamber 164. This causes oil to be fed from the bore 169 into the line 28 so that the ram 29 is moved upwards. Oil displaced by the ram 29 is then fed to the line 10 via the line 30, port 126', the chamber 159', bores 171', chambers 165 and 164, bores 170', 168' and 167' and port 120'. The ram 9 is thereby also moved upwards and oil displaced thereby is fed to the reservoir 1 via lines 5 and 7.

Thus irrespective of the direction of turn the valve arrangement 12 or 112 is automatically capable of directing flow to and from the ram 29 in the required manner or alternatively of preventing flow to and from the ram 29 by the operation of a simply openable and closable valve.

It is to be understood that the term steering motor is intended to include, in addition to the single ram described and illustrated, more than one ram acting in concert, a rotary actuator of the cylinder and vane type or any other hydraulic motor.

I claim:

1. A hydraulic steering system for selective two-wheeled and four-wheeled steering of a vehicle having two pairs of dirigible wheels, comprising: a first circuit including a source of pressure fluid, a double-acting steering motor for steering a first pair of wheels, a steering valve for directing pressure fluid from the source to the motor in a manner appropriate to the desired steering direction, and a manually operable valve having a first position connecting one side of the first motor with the steering valve to effect steering of the first pair of wheels and a second position disconnecting the one side of the first motor from the steering valve, a second circuit including a second double-acting steering motor for steering a second pair of wheels and pressure responsive valve means interconnecting the first and second circuits, the pressure-responsive valve means being operable to connect both sides of the second motor with the first circuit to effect operation of both motors to steer both pairs of wheels in response to fluid pressure caused by operation of the steering valve when the manually operable valve is in its second position.

2. The system of claim 1, wherein the pressure-responsive valve means comprise a pair of valves, each controlling communication of fluid pressure from the first circuit to one side of the other steering motor, each valve including a valve member having a surface responsive to fluid pressure caused by operation of the steering valve to steer in one direction to shift the valve to a position communicating this pressure to one side of the other steering motor and connecting the other side of the other steering motor with the first circuit.

3. A hydraulic steering system for selective two-wheeled and four-wheeled steering of a vehicle having at least two pairs of dirigible wheels, comprising: a pump, a steering valve for directing the flow from the pump in a manner appropriate to the desired steering direction, steering motors for steering associated pairs of wheels and valve means for selecting steering either of two wheels or of four wheels, the valve means including a manually operable openable or closable valve connected with the steering valve and one steering motor for steering an associated pair of wheels, and a pressure-responsive valve means arrangement connected in parallel with the manually openable valve and connected with another steering motor for steering another associated pair of wheels, the pressure-responsive valve arrangement being operative to direct flow to and from the other steering motor only when pressure is applied at one or the other side of the manually operable valve in a direction dependent on which side of the manually operable valve is under pressure.

4. A system according to claim 3, wherein the pressure-responsive valve arrangement comprises a pair of valves each including a valve member responsive to pressure applied in first and second chambers and the first chamber of each valve and the second chamber of the other valve being in common constant communication with a respective side of the manually operable valve and each side of the other steering motor being communicable with the first chamber of one valve on opening of that one valve and communicable with the second chamber of the other valve on opening of that other valve and each valve being such it will only open when pressure is applied to its first chamber to the exclusion of its second chamber.

5. A system according to claim 4, wherein the valve member of each valve is spring urged towards a closing position, includes a first closure portion for opening into, and closing from, communication with the first chamber of that valve a port connected to one end of the other steering motor, and includes a second closure portion for opening, and closing from, communication with the second chamber a third chamber in constant communication with the other end of the other steering motor.

6. A system according to claim 5, wherein the first closure portion is a piston portion dividing, and responsive to pressure applied in, the first and second chambers.

7. A system according to claim 5, wherein each valve member is a spool valve member having a first shoulder responsive to pressure applied in the first chamber, a second shoulder constituting the first closure portion, a third shoulder, and a smaller fourth shoulder facing the third shoulder constituting the second closure portion, the third and fourth shoulders being responsive to pressure applied in the second chamber to urge the valve member in a valve-closing direction.